United States Patent
Ishii (10) Patent No.: US 7,668,336 B2
(45) Date of Patent: Feb. 23, 2010

(54) EXTRACTING EMBEDDED INFORMATION FROM A DOCUMENT

(75) Inventor: Masaki Ishii, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 837 days.

(21) Appl. No.: 11/359,486

(22) Filed: Feb. 23, 2006

(65) Prior Publication Data

US 2006/0193525 A1 Aug. 31, 2006

(30) Foreign Application Priority Data

Feb. 25, 2005 (JP) ............................. 2005-050593

(51) Int. Cl.
*H04K 1/00* (2006.01)
(52) U.S. Cl. .................................................... 382/100
(58) Field of Classification Search ................ 382/100, 382/190, 193, 202; 380/54, 210, 287; 713/176; 283/72, 85, 93
See application file for complete search history.

(56) References Cited

U.S. PATENT DOCUMENTS

| | | | |
|---|---|---|---|
| 7,426,284 B2 * | 9/2008 | Ishii | 382/100 |
| 2005/0152006 A1 * | 7/2005 | Abe et al. | 358/3.28 |
| 2005/0276439 A1 * | 12/2005 | Ishii | 382/100 |
| 2008/0260200 A1 * | 10/2008 | Suzaki | 382/100 |
| 2009/0028381 A1 * | 1/2009 | Aoyagi | 382/100 |

FOREIGN PATENT DOCUMENTS

| | | |
|---|---|---|
| JP | 2833975 B2 | 10/1998 |
| JP | 2003-209676 A | 7/2003 |
| JP | 2003-283797 A | 10/2003 |
| JP | 2004-80136 A | 3/2004 |
| JP | 2004-336219 A | 11/2004 |

* cited by examiner

*Primary Examiner*—Andrew W Johns
(74) *Attorney, Agent, or Firm*—Dickstein Shapiro LLP (57) ABSTRACT

An apparatus, method, system, computer program and product, each capable of extracting embedded information from a document. The method includes inputting the document having the embedded information, wherein the embedded information is arranged in an embedded area of the document so as to form a grid pattern, obtaining a horizontal regression line representing a horizontal line of the embedded area and a vertical regression line representing a vertical line of the embedded area, moving the horizontal regression line and the vertical regression line across the embedded area to respectively obtain a plurality of horizontal parallel lines and a plurality of vertical parallel lines, detecting a location of the embedded information based on intersection points formed by the plurality of horizontal parallel lines and the plurality of vertical parallel lines, extracting the embedded information from the location detected by the detecting step, and outputting the embedded information to an output device.

18 Claims, 6 Drawing Sheets

EXTRACTING EMBEDDED INFORMATION FROM A DOCUMENT

This patent application is based on and claims priority to Japanese Patent Application No. 2005-050593, filed on Feb. 25, 2005, in the Japanese Patent Office, the entire contents of which are hereby incorporated by reference.

BACKGROUND OF THE INVENTION

The following disclosure relates generally to an apparatus, method, system, computer program, and product, each capable of extracting embedded information from a document.

Information that is not perceptible to the human eye is often embedded into a document for the purpose of establishing the ownership of the document, tracking the origin of the document, protecting the document from unauthorized alteration, checking the integrity of the document, etc. In order to achieve such purposes, the embedded information needs to be extracted with high accuracy. However, due to its imperceptible nature, extracting the embedded information often requires some effort and time.

For example, the embedded information may be embedded in the form of a dot pattern. In order to extract the dot pattern with high accuracy, various forms of image processing are often applied to specify the location of the dot pattern. In one example, a filter capable of detecting the dot pattern may be applied to the document. In another example, additional information indicating the location of the dot pattern may be previously embedded in the document in a corresponding manner with the dot pattern.

BRIEF SUMMARY OF THE INVENTION

In light of the above-described and other problems, exemplary embodiments of the present invention include an apparatus, method, system, computer program, and product, each capable of extracting embedded information from a document. In one example, the document having the embedded information is input. The embedded information is arranged in an embedded area of the document so as to form a grid pattern. A plurality of regression lines including a horizontal regression line representing a horizontal line of the embedded area and a vertical regression line representing a vertical line of the embedded area is obtained. The horizontal regression line is moved across the embedded area to obtain a plurality of horizontal parallel lines. The vertical regression line is moved across the embedded area to obtain a plurality of vertical parallel lines. Based on intersection points formed by the plurality of horizontal parallel lines and the vertical parallel lines, a location of the embedded information is detected. The embedded information is extracted from the detected location.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
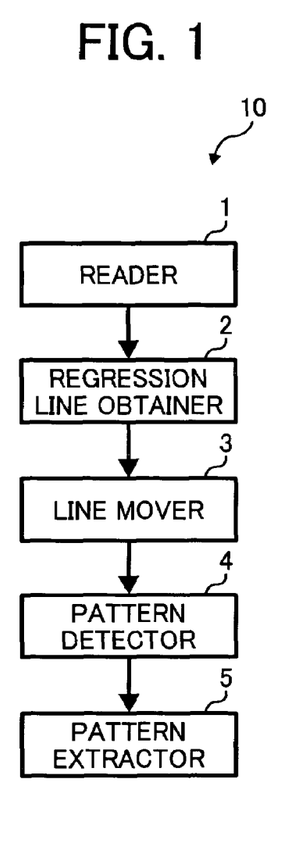
FIG. 1 is a block diagram illustrating the functional structure of an image processing apparatus according to an exemplary embodiment of the present invention.

In describing the exemplary embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image processing apparatus 10 according to an exemplary embodiment of the present invention.

The image processing apparatus 10 is capable of extracting embedded information from a document. As shown in FIG. 1, the image processing apparatus 10 includes a reader 1, a regression line obtainer 2, a line mover 3, a pattern detector 4, and a pattern extractor 5. The reader 1 obtains the document to be processed. In this example, the document has an embedded area in which embedded information is arranged so as to form a grid pattern. The regression line obtainer 2 obtains a plurality of regression lines from the document, such as a horizontal regression line representing a horizontal line of the embedded area and a vertical regression line representing a vertical line of the embedded area. The line mover 3 moves each one of the horizontal and vertical regression lines in parallel across the embedded area to obtain a plurality of parallel lines for each one of the horizontal and vertical regression lines. The pattern detector 4 detects the location of the embedded information based on the intersection points of the horizontal and vertical parallel lines. The pattern extractor 5 extracts the embedded information from the location detected by the pattern detector 4.

Figure 2:
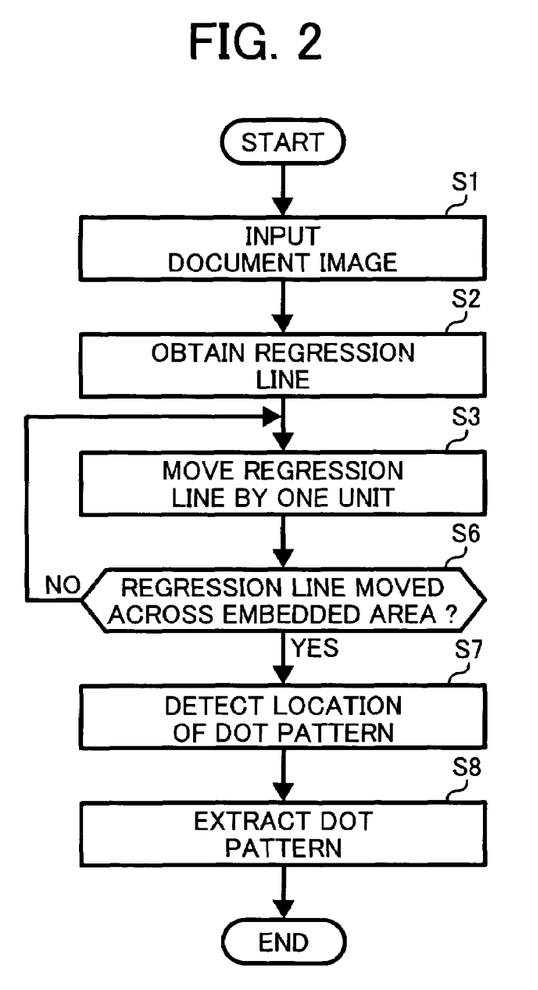
FIG. 2 is a flowchart illustrating a process of extracting embedded information from a document according to an exemplary embodiment of the present invention.
Figure 3:
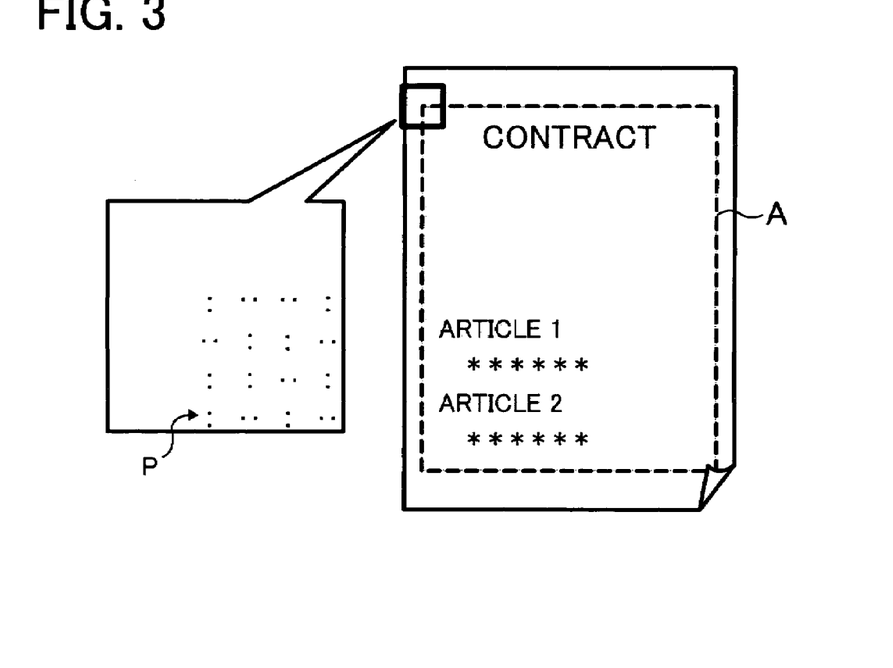
FIG. 3 is an illustration of an example document to be processed by the image processing apparatus of FIG. 1.

Referring now to FIG. 2, an operation of extracting embedded information from a document is explained according to an exemplary embodiment of the present invention. In this example, the embedded information is embedded into the document using a first dot pattern representing "0" bit information and a second dot pattern representing "1" bit information. For example, as illustrated in FIG. 3, two kinds of dot patterns (collectively referred to as the "dot pattern P") are embedded in an embedded area A so as to form a grid pattern, for example, by using the methods described in any one of US Patent Application Publication No. 20040148261, published on Jul. 29, 2004, US Patent Application Publication No. 20050152006, published on Jul. 14, 2005, and US Patent Application Publication No. 20050276439, published on Dec. 15, 2005, the entire contents of which are hereby incorporated by reference.

Referring back to FIG. 2, Step S1 inputs the document to be processed. The document may be provided in various ways. In one example, the document may be provided as a printed document. In another example, the document may be provided via a network as electronic data. If a printed document is obtained as the document to be processed, the reader 1 scans the printed document into electronic data.

Step S2 obtains a plurality of regression lines, such as a horizontal regression line representing a horizontal line of the embedded area A and a vertical regression line representing a vertical line of the embedded area A. In this example, the regression line obtainer 2 obtains an upper regression line indicating an upper borderline of the embedded area A, a lower regression line indicating a lower borderline of the embedded area A, a left regression line indicating a left borderline of the embedded area A, and a right regression line indicating a right borderline of the embedded area A.

To obtain these four regression lines, the regression line obtainer 2 first extracts a plurality of dot patterns that matches a standard dot pattern from each of the borderlines of the embedded area A, using the template matching method, for example. The standard dot pattern may be previously stored in a memory incorporated in the image processing apparatus 10. Alternatively, the standard dot pattern may be obtained from the outside, such as via a network or from a removable recording medium.

Figure 4:
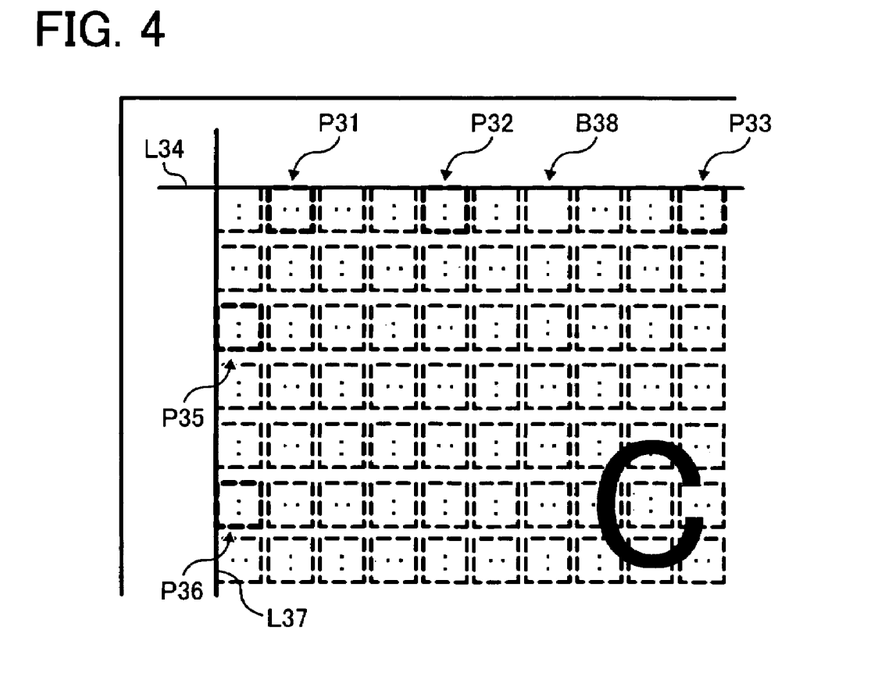
FIG. 4 is an illustration for explaining the operation of extracting an example regression line from the document shown in FIG. 3.

Further, in this example, the regression line obtainer 2 may search a selected portion of the embedded area A. Alternatively, the regression line obtainer 2 may stop searching when a predetermined number of dot patterns is extracted. For example, as illustrated in FIG. 4, the regression line obtainer 2 compares the embedded area A with the standard dot pattern, block by block, to extract a dot pattern that matches the standard dot pattern. In this example, the block has a dimension previously determined based on the dimension of the standard dot pattern. If a target block of the embedded area A has the dot pattern that matches the standard dot pattern, the dot pattern is extracted. If a target block of the embedded area A does not have the dot pattern that matches the standard dot pattern (indicated by B38 of FIG. 4), the dot pattern is not extracted.

Furthermore, the regression line may be obtained using any kind of regression analysis method. In one example, as illustrated in FIG. 4, the regression line may be obtained using a linear regression method. Referring to FIG. 4, dot patterns P35 and P36 are extracted from the left borderline, while dot patterns P31, P32, and P33 are extracted from the upper borderline. Referring to FIG. 4, based on the upper left points of the blocks respectively having the extracted dot patterns P35 and P36, the regression line obtainer 2 obtains a left regression line L37 using the linear regression method. Similarly, based on the upper left points of the blocks respectively having the extracted dot patterns P31, P32, and P33, the regression line obtainer 2 obtains an upper regression line L34. Although not shown in FIG. 4, a right regression line and a lower regression line are respectively obtained in a substantially similar manner.

Figure 6:
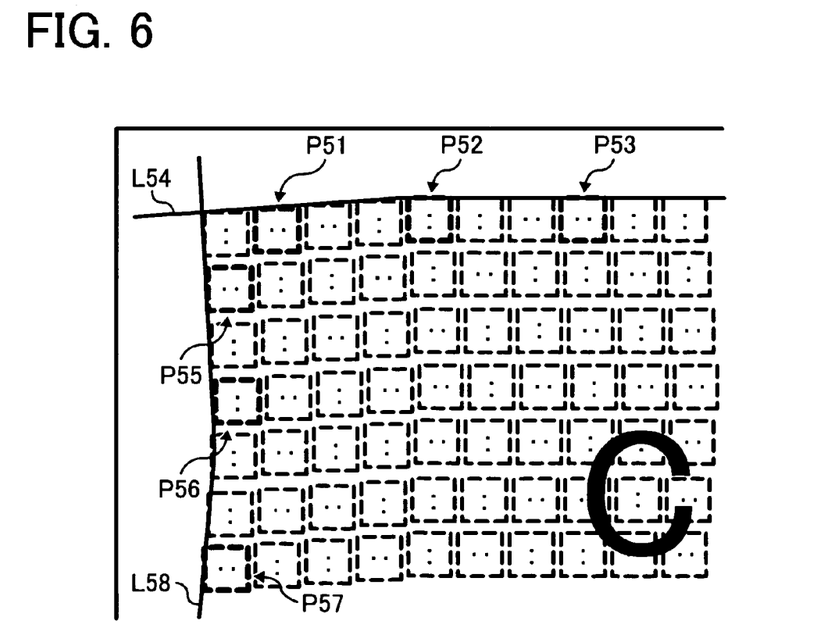
FIG. 6 is an illustration for explaining the operation of extracting an example regression line from the document shown in FIG. 3.

In another example, as illustrated in FIG. 6, the regression line may be obtained as a curve or a polygonal line using a nonlinear regression method. Referring to FIG. 6, dot patterns P55, P56, and P57 are extracted from the left borderline, while dot patterns P51, P52, and P53 are extracted from the upper borderline. Based on the upper left points of the blocks respectively having the extracted dot patterns P55, P56, and P57, the regression line obtainer 2 obtains a left regression line L58 using the nonlinear regression method. Similarly, based on the upper left points of the blocks respectively having the extracted dot patterns P51, P52, and P53, the regression line obtainer 2 obtains an upper regression line L54. Although not shown in FIG. 6, a right regression line and a lower regression line are respectively obtained in a substantially similar manner.

In Steps S3 and S6, the line mover 3 moves each one of the horizontal regression line and the vertical regression line in parallel across the embedded area A to obtain a plurality of parallel lines corresponding to each one of the horizontal regression line and the vertical regression line.

Figure 5:
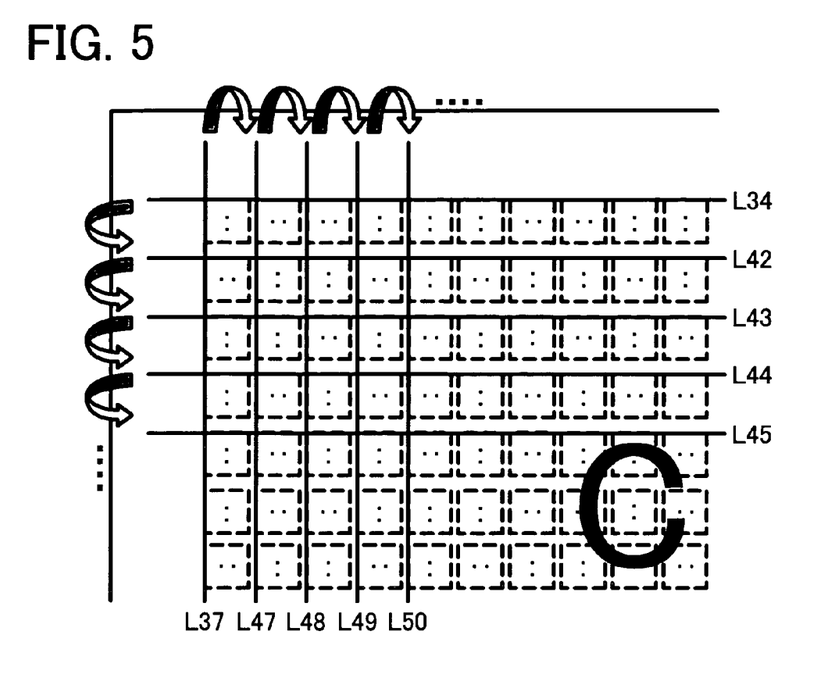
FIG. 5 is an illustration for explaining the operation of obtaining an example parallel line from the document shown in FIG. 3.

In one example, when the upper regression line L34 is obtained as illustrated in FIG. 4, in Step S3, the line mover 3 moves the upper regression line L34 downward toward the lower regression line by one unit to obtain a horizontal parallel line L42 of FIG. 5. In this example, one unit refers to a distance of movement that is previously set equal to the dimension of the standard dot pattern. In Step S6, the line mover 3 determines whether the upper regression line L34 is moved all the way across the embedded area, thus reaching the lower regression line. If the upper regression line L34 reaches the lower regression line ("YES" in Step S6), the operation proceeds to Step S7. Otherwise ("NO" in Step S6), the operation returns to Step S3 to further move the upper regression line L34 downward toward the lower regression line by one unit to obtain a horizontal parallel line L43 of FIG. 5. In this manner, a plurality of horizontal parallel lines including horizontal parallel lines L42, L43, L44, and L45 is obtained as illustrated in FIG. 5.

Similarly, when the left regression line L37 is obtained as illustrated in FIG. 4, in Step S3, the line mover 3 moves the left regression line L37 toward the right regression line by one unit to obtain a vertical parallel line L47 of FIG. 5. In Step S6, the line mover 3 determines whether the left regression line L37 is moved all the way across the embedded area, thus reaching the right regression line. If the left regression line L37 reaches the right regression line ("YES" in Step S6), the operation proceeds to Step S7. Otherwise ("NO" in Step S6), the operation returns to Step S3 to further move the left regression line L37 toward the right regression line by one unit to obtain a vertical parallel line L48 of FIG. 5. In this manner, a plurality of vertical parallel lines L47, L48, L49, and L50 is obtained as illustrated in FIG. 5.

Figure 7:
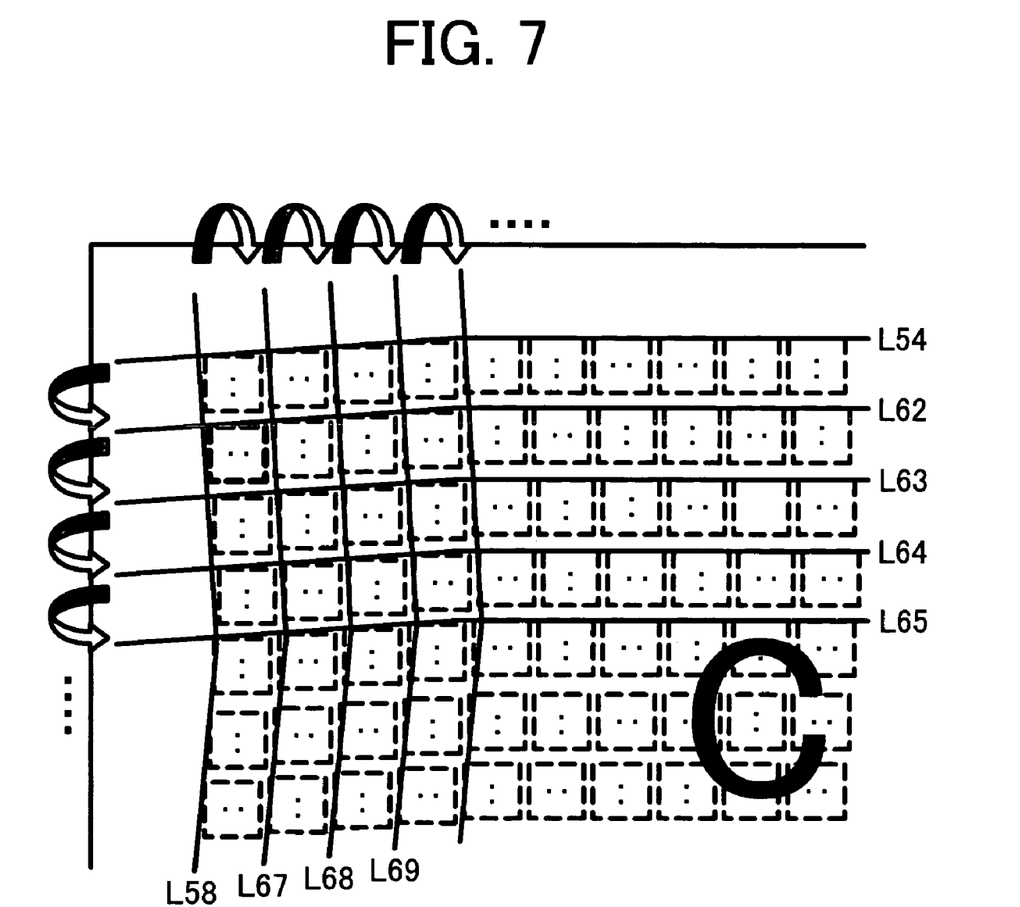
FIG. 7 is an illustration for explaining the operation of obtaining an example parallel line from the document shown in FIG. 3.

In another example, when the upper regression line L54 is obtained as illustrated in FIG. 6, in Step S3, the line mover 3 moves the upper regression line L54 downward toward the lower regression line by one unit to obtain a horizontal parallel line L62 of FIG. 7. In Step S6, the line mover 3 determines whether the upper regression line L54 is moved all the way across the embedded area, thus reaching the lower regression line. If the upper regression line L54 reaches the lower regression line ("YES" in Step S6), the operation proceeds to Step S7. Otherwise ("NO" in Step S6), the operation returns to Step S3 to further move the upper regression line L54 downward toward the lower regression line by one unit to obtain a horizontal parallel line L63 of FIG. 7. In this manner, a plurality of horizontal parallel lines including horizontal parallel lines L62, L63, L64 and L65 is obtained as illustrated in FIG. 7.

When the left regression line L58 is obtained as illustrated in FIG. 6, Steps S3 and S6 are performed in a substantially similar manner as described above to obtain a plurality of vertical parallel lines including vertical parallel lines L67, L68, and L69 as illustrated in FIG. 7.

Step S7 specifies the location of each dot pattern using the horizontal and vertical parallel lines obtained in the previous step. For example, as illustrated in FIG. 5, the pattern detector 4 estimates the location of each dot pattern based on the intersection points at which the horizontal parallel lines and the vertical parallel lines intersect.

Step S8 extracts a dot pattern from each of the locations specified in the previous step. The extracted dot pattern may be output for further processing.

The operation of FIG. 2 may be performed in various other ways. In one example, once the location of each dot pattern is detected in Step S7, pattern matching may be applied to the detected location to further increase accuracy in specifying the location of each dot pattern. In another example, in Step S3, the line mover 3 may move the lower regression line toward the upper regression line by one unit to obtain a plurality of horizontal parallel lines.

Figure 8:
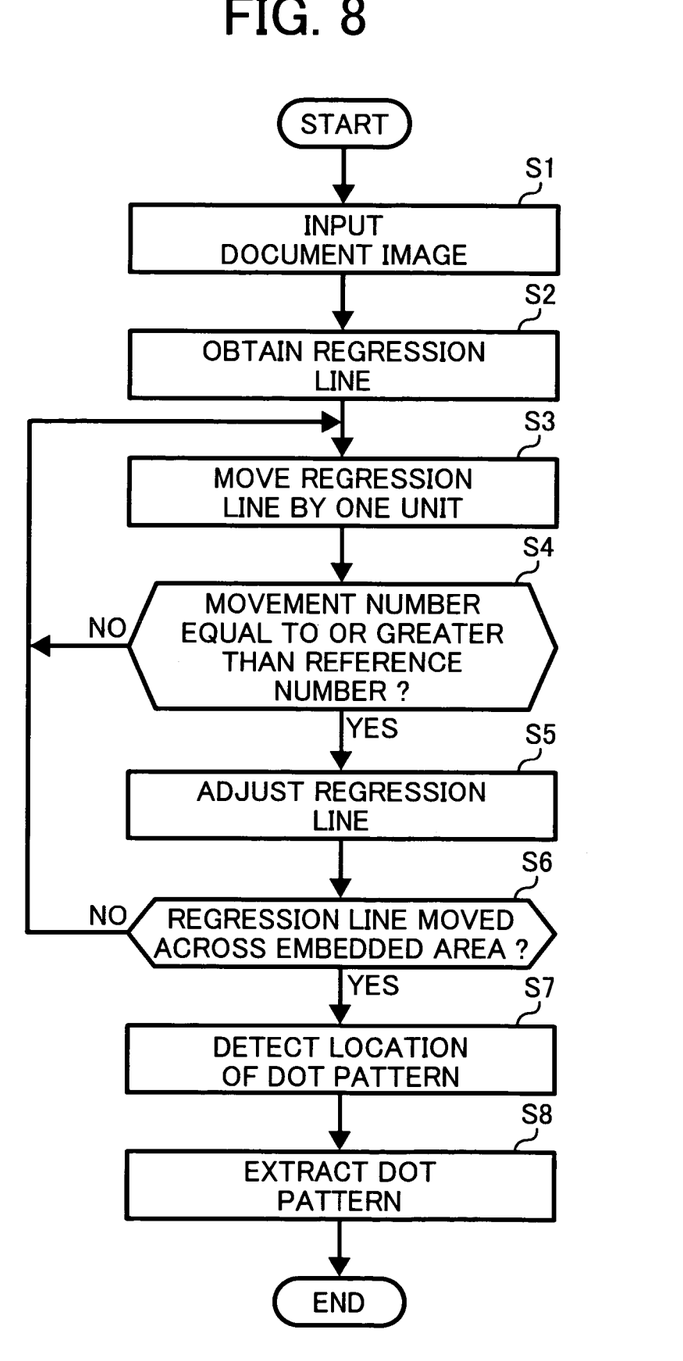
FIG. 8 is a flowchart illustrating the processing operation of extracting embedded information from a document according to an exemplary embodiment of the present invention.

Referring now to FIG. 8, an operation of extracting embedded information from a document is explained according to another exemplary embodiment of the present invention. The operation of FIG. 8 is substantially similar to the operation of FIG. 2. The differences include the addition of Steps 4 and 5.

Step S4 determines whether a number of units representing a distance of the regression line moved by the line mover 3 ("the movement number") is greater than a reference number. In this example, the reference number may be previously determined by default or according to the user's preference. If the movement number is equal to or greater than the reference number ("YES" in Step S4), the operation proceeds to Step S5. Otherwise ("NO" in Step S4), the operation returns to Step S3 to further move the regression line by one unit.

Step S5 adjusts the regression line, which is currently used by the line mover 3 to obtain a plurality of parallel lines. More specifically, the regression line obtainer 2 extracts a plurality of dot patterns that matches the standard dot pattern from the location that is currently processed using the template matching method, for example. The regression line obtainer 2 then obtains a regression line based on the extracted dot patterns in a substantially similar manner as described referring to Step S2 of FIG. 2.

By updating the regression line as the regression line moves across the embedded area, any deformation in the document may be taken into account, thus further increasing accuracy in detecting the location of each dot pattern.

Figure 9:
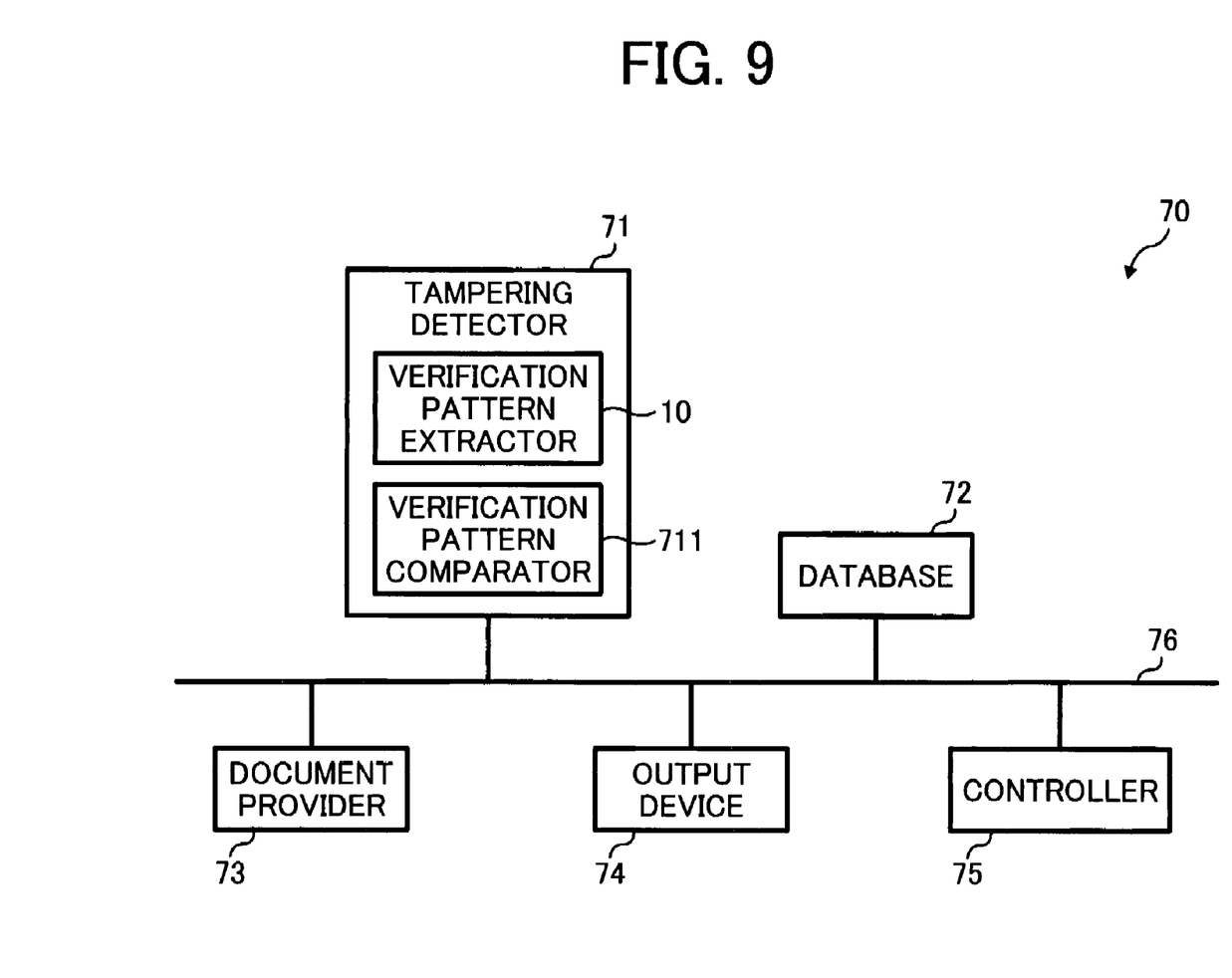
FIG. 9 is a block diagram illustrating the structure of an image processing system according to an exemplary embodiment of the present invention.

The image forming apparatus 10 of FIG. 1 may be used alone, or it may be used in combination with any other device or apparatus. For example, as illustrated in FIG. 9, the image forming apparatus 10 of FIG. 1 may be incorporated in an image processing system 70 as a verification pattern extractor. The image processing system 70 includes a tampering detector 71 having the verification pattern extractor 10 and a verification pattern comparator 711, a database 72, a document provider 73, an output device 74, and a controller 75, which are connected via a bus 76.

The document provider 73 includes any kind of device capable of scanning a printed document into electronic data, and shares the same function with the reader 1 of FIG. 1. The document provider 73 may be implemented by a scanner, for example.

The controller 75 includes any kind of processor capable of controlling operation of the image processing system 70. The tampering detector 71 detects whether a document obtained by the document provider 73 has been tampered with, using a verification pattern embedded in the document. In this example, the verification pattern provides the same function as the function of the embedded pattern. More specifically, the verification pattern extractor 10 extracts the verification pattern from the document in a substantially similar manner as described above referring to any one of FIGS. 1 to 8, and outputs the extracted verification pattern to the verification pattern comparator 711. The verification pattern comparator 711 compares the extracted verification pattern with an original verification pattern, which has been originally embedded in the document, to generate a comparison result. In this example, the database 72 may store various data such as the original verification pattern, or a standard verification pattern to be used by the verification pattern extractor 10, for example. Any one of the controller 75, the tampering detector 71, and the database 72 may be implemented by a general-purpose computer, such as a personal computer, for example.

The output device 74 outputs the comparison result generated by the verification pattern comparator 711. The output device 74 may be implemented by a speaker, display, printer, etc.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Furthermore, as described above, any one of the above-described and other methods of the present invention may be embodied in the form of a computer program stored in any kind of storage medium. Examples of storage media include, but are not limited to, flexible disks, hard disks, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed as new and desired to be protected by Letters Patent of the United States is:

1. A method for extracting embedded information from a document, the method being carried out on a computing apparatus, the method comprising the steps of:
   inputting the document having the embedded information, wherein the embedded information is arranged in an embedded area of the document so as to form a grid pattern;
   obtaining a horizontal regression line representing a horizontal line of the embedded area and a vertical regression line representing a vertical line of the embedded area;
   moving the horizontal regression line and the vertical regression line across the embedded area to respectively obtain a plurality of horizontal parallel lines and a plurality of vertical parallel lines;
   detecting a location of the embedded information based on intersection points formed by the plurality of horizontal parallel lines and the plurality of vertical parallel lines;
   extracting the embedded information from the location detected by the detecting step; and
   outputting the extracted embedded information to an output device.

2. The method of claim 1, wherein the embedded information is expressed in the form of dot pattern.

3. The method of claim 2, wherein the obtaining step comprises the steps of:
  obtaining a standard dot pattern;
  extracting a plurality of dot patterns that matches the standard dot pattern, respectively, from the horizontal line of the embedded area and the vertical line of the embedded area; and
  performing regression analysis on the plurality of dot patterns extracted by the extracting step,
  wherein the horizontal regression line represents the plurality of dot patterns extracted from the horizontal line of the embedded area, and the vertical regression line represents the plurality of dot patterns extracted from the vertical line of the embedded area.

4. The method of claim 1, wherein the horizontal regression line comprises a first horizontal regression line and a second horizontal regression line, and the vertical regression line comprises a first vertical regression line and a second vertical regression line, wherein the first horizontal regression line, the second horizontal regression line, the first vertical regression line, and the second vertical regression line together represent a borderline of the embedded area.

5. The method of claim 4, wherein the moving step comprises the steps of:
  moving the first horizontal regression line in parallel toward the second horizontal regression line by one unit to obtain a first horizontal parallel line; and
  determining whether the first horizontal regression line reaches the second horizontal regression line,
  wherein the moving step is repeated when the determining step determines that the first horizontal regression line does not reach the second horizontal regression line.

6. The method of claim 5, wherein the moving step further comprises the steps of:
  determining whether a movement number is greater than or equal to a reference number; and
  adjusting the first horizontal regression line when the movement number is greater than or equal to the reference number.

7. The method of claim 4, wherein the moving step comprises the steps of:
  moving the first vertical regression line in parallel toward the second vertical regression line by one unit to obtain a first vertical parallel line; and
  determining whether first vertical regression line reaches the second vertical regression line,
  wherein the moving step is repeated when the determining step determines that the first vertical regression line does not reach the second vertical regression line.

8. The method of claim 7, wherein the moving step further comprises the steps of:
  determining whether a movement number is greater than or equal to a reference number; and
  adjusting the first vertical regression line when the movement number is greater than or equal to the reference number.

9. The method of claim 1, wherein the detecting step comprises the act of:
  applying pattern matching to a location determined by the intersection points to generate a matching result,
  wherein the location of the embedded information is determined based on the matching result.

10. An image processing apparatus, comprising:
  means for inputting a document having embedded information, wherein the embedded information is arranged in an embedded area of the document so as to form a grid pattern;
  means for obtaining a horizontal regression line representing a horizontal line of the embedded area and a vertical regression line representing a vertical line of the embedded area;
  means for moving the horizontal regression line and vertical regression line in parallel across the embedded area to respectively obtain a plurality of horizontal parallel lines and a plurality of vertical parallel lines;
  means for detecting a location of the embedded information based on intersection points formed by the plurality of horizontal parallel lines and plurality of vertical parallel lines; and
  means for extracting the embedded information from the location detected by the detecting means.

11. The apparatus of claim 10, wherein the horizontal regression line is updated as the horizontal regression line is moved by a predetermined distance.

12. The apparatus of claim 11, wherein the predetermined distance is set based on a dimension of the embedded information.

13. The apparatus of claim 10, wherein the vertical regression line is updated as the vertical regression line is moved by a predetermined distance.

14. The apparatus of claim 13, wherein the predetermined distance is set based on a dimension of the embedded information.

15. An image processing system, comprising:
  a processor; and
  a storage device comprising a program that is configured to perform, when executed by the processor, a plurality of functions comprising:
  inputting the document having the embedded information, wherein the embedded information is arranged in an embedded area of the document so as to form a grid pattern;
  obtaining a horizontal regression line representing a horizontal line of the embedded area and a vertical regression line representing a vertical line of the embedded area;
  moving the horizontal regression line and the vertical regression line across the embedded area to respectively obtain a plurality of horizontal parallel lines and a plurality of vertical parallel lines;
  detecting a location of the embedded information based on intersection points formed by the plurality of horizontal parallel lines and the plurality of vertical parallel lines; and
  extracting the embedded information from the location detected by the function of detecting.

16. The system of claim 15, wherein the plurality of functions further comprises comparing the embedded information with original information to generate a comparison result.

17. The system of claim 16, further comprising an output device configured to output the comparison result.

18. A computer readable medium storing computer instructions for performing an image processing method comprising the steps of:
  inputting the document having the embedded information, wherein the embedded information is arranged in an embedded area of the document so as to form a grid pattern;
  obtaining a horizontal regression line representing a horizontal line of the embedded area and a vertical regression line representing a vertical line of the embedded area;

moving the horizontal regression line and the vertical regression line across the embedded area to respectively obtain a plurality of horizontal parallel lines and a plurality of vertical parallel lines;

detecting a location of the embedded information based on intersection points formed by the plurality of horizontal parallel lines and the plurality of vertical parallel lines; and extracting the embedded information from the location detected by the detecting step.

* * * * *

UNITED STATES PATENT AND TRADEMARK OFFICE
CERTIFICATE OF CORRECTION

PATENT NO. : 7,668,336 B2
APPLICATION NO. : 11/359486
DATED : February 23, 2010
INVENTOR(S) : Masaki Ishii It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this

Fourth Day of January, 2011

David J. Kappos
*Director of the United States Patent and Trademark Office*